United States Patent [19]
Kawasato et al.

[11] Patent Number: 5,969,936
[45] Date of Patent: Oct. 19, 1999

[54] ELECTRIC DOUBLE LAYER CAPACITOR AND ELECTROLYTE THEREFOR

[75] Inventors: Takeshi Kawasato; Manabu Suhara; Kazuya Hiratsuka; Manabu Tsushima, all of Yokohama, Japan

[73] Assignee: Asahi Glass Company Ltd., Tokyo, Japan

[21] Appl. No.: 09/045,905

[22] Filed: Mar. 23, 1998

[30] Foreign Application Priority Data

Mar. 24, 1997 [JP] Japan ..................................... 9-088825

[51] Int. Cl.$^6$ ....................................................... H01G 9/02
[52] U.S. Cl. .......................... 361/502; 361/505; 361/504; 429/335; 429/326
[58] Field of Search ..................................... 428/326, 330, 428/338, 335, 203; 252/62.2, 500; 361/505, 502–504, 301.1, 501, 500, 527, 525

[56] References Cited

U.S. PATENT DOCUMENTS 4,762,644  8/1988  Kobayashi et al. ..................... 252/500
5,462,820 10/1995  Tanaka ..................................... 429/174

FOREIGN PATENT DOCUMENTS 8-37133  2/1996  Japan .

*Primary Examiner*—Dean A. Reichard
*Assistant Examiner*—Anthony Dinkins
*Attorney, Agent, or Firm*—Oblon, Spivak, McClelland, Maier & Neustadt, P.C.

[57] ABSTRACT

An electric double layer capacitor including electrodes made of carbon material as the main component, and an electrolyte capable of forming an electric double layer at the interface with the electrodes, wherein the electrolyte includes an organic type mixed solvent containing propylene carbonate and an asymmetrical chain carbonic acid ester represented by the general formula $R^1OC(=O)OR^2$, wherein $R^1$ and $R^2$ are mutually different monovalent organic groups, and a solute comprising a quaternary onium salt.

17 Claims, No Drawings

ELECTRIC DOUBLE LAYER CAPACITOR AND ELECTROLYTE THEREFOR

The present invention relates to an electric double layer capacitor and an electrolyte therefor.

Conventional electric double layer capacitors are available in the form of a coin type wherein an element having a separator sandwiched between a pair of polarizable electrodes which are formed on current collectors and which are made of active carbon as the main component, is accommodated together with an electrolyte in a metal casing, which is sealed via a gasket by a metal cover, or a rolled type wherein an element having a pair of polarizable electrode sheets which are rolled with a separator interposed therebetween, is accommodated together with an electrolyte in a metal casing, and an opening of the casing is sealed to prevent evaporation of the electrolyte from the opening.

Further, a stacked electric double layer capacitor has also been proposed for large current and large capacitance, wherein an element having many polarizable electrodes sheets stacked with a separator interposed therebetween, is incorporated (JP-A-4-154106, JP-A-3-203311, JP-A-4-286108). Namely, polarizable electrodes sheets molded in a rectangular shape are used as positive and negative electrodes, and they are alternately stacked with a separator interposed therebetween to form an element, which is accommodated in a casing in such a state that a positive lead member and a negative lead member are connected by caulking to the respective ends of the positive and negative electrodes. The element is impregnated with an electrolyte, and the casing is hermetically closed with a cover.

As the electrolyte for conventional electric double layer capacitors, not only an aqueous electrolyte containing a mineral acid such as sulfuric acid, an alkali metal salt or an alkali, but also various non-aqueous electrolytes have been used. As a solvent for such non-aqueous electrolytes, propylene carbonate, γ-butyrolactone, acetonitrile, dimethylformamide (JP-A-49-68254), or a sulfolane derivative or the like (JP-A-62-237715), has been known. When withstand voltages are compared, the aqueous electrolyte has a withstand voltage of 0.8 V, whereas the non-aqueous electrolyte has a withstand voltage of 2.5 to 3.3 V. As the electrostatic energy of a capacitor is in proportion to the square of the withstand voltage, the non-aqueous electrolyte is advantageous over the aqueous electrolyte from the viewpoint of the electrostatic energy. However, the above mentioned non-aqueous electrolytes have had a problem that as compared with the aqueous electrolyte, deterioration of the electroconductivity is remarkable especially in a low temperature range, and when charging is carried out at a low temperature, it takes a long time for charging, and when discharging is carried out at a large current, a decrease in the output voltage due to internal resistance will be substantial.

The present inventors have previously proposed an electric double layer capacitor wherein a mixed solvent comprising a cyclic carbonate and a chain carbonate as a solvent having a low freezing temperature and a low viscosity, is used to improve the low temperature characteristics (JP-A-8-37133). The effect for improving the low temperature characteristics has been confirmed in its use for memory backup where discharge is carried out at a small electric current, but it has not been adequate in its use where discharge is carried out at a large electric current.

Accordingly, it is an object of the present invention to solve the above mentioned problems of the prior art and to provide an electric double layer capacitor whereby the decrease in the output voltage is small even in discharging at a large electric current at a low temperature and which is thus excellent in the reliability.

The present invention provides an electric double layer capacitor comprising electrodes made of carbon material as the main component, and an electrolyte capable of forming an electric double layer at the interface with the electrodes, wherein the electrolyte comprises an organic type mixed solvent containing propylene carbonate and an asymmetrical chain carbonic acid ester represented by the general formula $R^1OC(=O)OR^2$, wherein $R^1$ and $R^2$ are mutually different monovalent organic groups, and a solute comprising a quaternary onium salt.

Now, the present invention will be described in detail with reference to the preferred embodiments.

The propylene carbonate to be used for the electrolyte of the electric double layer capacitor of the present invention, is a solvent which has a high dielectric constant and provides relatively good low temperature characteristics when used as an electrolyte among non-aqueous solvents capable of dissolving a solute at a high concentration and which is also electrochemically stable.

A chain carbonic acid ester is an electrochemically stable solvent which has a low freezing point and undergoes little increase of the viscosity even at a low temperature. Especially, an asymmetrical chain carbonic acid ester represented by the general formula $R^1OC(=O)OR^2$, wherein $R^1$ and $R^2$ are mutually different monovalent organic groups, to be used in the present invention, not only has the above characteristics but also is capable of increasing the concentration of a solute in an electrolyte, whereby the electroconductivity in the electrolyte at a low temperature can be made particularly excellent.

In the general formula $R^1OC(=O)OR^2$ for the asymmetrical chain carbonic acid ester in the present invention, $R^1$ and $R^2$ are suitably selected from monovalent organic groups such as alkyl groups and aryl groups. Such monovalent organic groups may be organic groups substituted by halogens. Taking into consideration the melting point, viscosity and dielectric constant of the mixed solvent comprising the asymmetrical chain carbonic acid ester and propylene carbonate, each of organic groups $R^1$ and $R^2$ is preferably a group having from 1 to 4 carbon atoms and is preferably an organic group selected from the group consisting of a methyl group, an ethyl group, an isopropyl group, a n-propyl group and a 2,2,2-trifluoroethyl group. Specific examples of more preferred asymmetrical chain carbonic acid esters include methyl ethyl carbonate, methyl isopropyl carbonate, ethyl isopropyl carbonate, and 2,2,2-trifluoroethyl methyl carbonate. It is particularly preferred to use methyl ethyl carbonate, whereby the viscosity of the electrolyte will be low.

In the present invention, the solvent for the electrolyte preferably comprises from 60 to 95 vol % of propylene carbonate and from 5 to 40 vol % of the asymmetrical chain carbonic acid ester. If the propylene carbonate is less than 60 vol %, the dielectric constant of the mixed solvent tends to be low, and the solute can not be dissolved at a high concentration, such being undesirable. On the other hand, if the asymmetrical chain carbonic acid ester is less than 5 vol %, the low temperature characteristics can not sufficiently be improved, such being undesirable. More preferably, the propylene carbonate is from 80 to 90 vol %, and the asymmetrical chain carbonic acid ester is from 10 to 20 vol %.

The solute to be used for the electrolyte for the electric double layer capacitor of the present invention, is a quaternary onium salt. The cation of such a quaternary onium salt may be represented by $R^3R^4R^5R^6N^+$ or $R^3R^4R^5R^6P^+$. Here, each of $R^3$, $R^4$, $R^5$, $R^6$, which are independent of one another, is a monovalent organic group, preferably a $C_{1-4}$ alkyl group. $R^3$, $R^4$, $R^5$ and $R^6$ may all be the same, but they are preferably at least two different alkyl groups.

As compared with a quaternary onium salt having a cation in which $R^3$, $R^4$, $R^5$ and $R^6$ are all the same, a quaternary onium salt having a cation wherein $R^3$, $R^4$, $R^5$ and $R^6$ are at least two different alkyl groups, has a large solubility in the solvent to be used in the present invention, whereby the concentration of the solute in the electrolyte can be made high. By bringing the solute to a high concentration, the electroconductivity of the electrolyte can be made high, such being desirable.

Further, each of $R^3$, $R^4$, $R^5$ and $R^6$ is preferably $CH_3$, $C_2H_5$, $C_3H_7$ or $C_4H_9$. Specific examples of the cation of the quaternary onium salt preferred in the present invention include $(C_2H_5)_3(CH_3)N^+$, $(C_2H_5)_2(CH_3)_2N^+$, $(C_2H_5)(CH_3)_3N^+$, $(C_3H_7)_3(CH_3)N^+$, $(C_3H_7)_2(CH_3)_2N^+$, $(C_3H_7)(CH_3)_3N^+$, $(C_3H_7)_3(C_2H_5)N^+$, $(C_3H_7)_2(C_2H_5)_2N^+$, $(C_3H_7)(C_2H_5)_3N^+$, $(C_2H_5)_3(CH_3)P^+$, $(C_2H_5)_2(CH_3)_2P^+$ and $(C_2H_5)(CH_3)_3P^+$. Here, $C_3H_7$ may be a n-propyl group or an isopropyl group, and $C_4H_9$ may be a n-butyl group, an isobutyl group, a sec-butyl group or a tert-butyl group. Further, $(n-C_3H_7)_3(i-C_3H_7)N^+$ or the like may also be used. Further, for example, $(C_3H_7)_3(CH_3)N^+$ may be $(n-C_3H_7)_3(CH_3)N^+$, $(n-C_3H_7)_2(i-C_3H_7)(CH_3)N^+$, $(n-C_3H_7)(i-C_3H_7)_2(CH_3)N^+$ or $(i-C_3H_7)_3(CH_3)N^+$, and the same applies to other cations having at least two butyl groups or propyl groups.

The solute to be used for the electrolyte, is preferably a salt comprising a quaternary onium cation wherein any two among the above $R^3$ to $R^6$ are different, and an anion such as $BF_4^-$, $PF_6^-$, $Cl^-$, $CF_3SO_3^-$, $AsF_6^-$, $N(SO_2CF_3)_2^-$, $NO_3^-$, $ClO_4^-$, $Br^-$ or $SO_4^{2-}$. Especially, $(C_2H_5)_3(CH_3)NBF_4$ is most preferred from the viewpoint of the solubility in the solvent and the electroconductivity and electrochemical stability of the solution.

The electroconductivity of the electrolyte increases in proportion to the concentration of the solute to a level about 1.5 mol/l, but at a concentration exceeding 1.5 mol/l, the electroconductivity tends to be constant. Accordingly, the concentration of the solute is preferably from 1.0 to 2.0 mol/l, more preferably from 1.2 to 1.8 mol/l.

The electrodes to be used for the electric double layer capacitor of the present invention are made of carbon material as the main component. The carbon material is preferably one having a specific surface area of from 500 to 3,000 $m^2/g$, more preferably from 700 to 2,000 $m^2/g$. Specifically, active carbon, carbon black or polyacene may, for example, be mentioned. It is particularly preferred to use carbon black having high electroconductivity as a conductive material, as mixed with active carbon. In such a case, the carbon black as a conductive material is preferably contained in an amount of from 5 to 20 wt % in the electrodes. If it is less than 5 wt %, the effects for reducing the resistance of the electrodes tend to be small. On the other hand, carbon black having high electroconductivity is usually incapable of increasing the capacitance of the electrical double layer capacitor as compared with active carbon, and the content is accordingly preferably at most 20 wt %.

In the present invention, the electrodes made of carbon material as the main component, preferably contain a binder such as polytetrafluoroethylene or polyvinylidene fluoride in order to maintain the shape and strength of the electrodes themselves. If the binder in the electrodes is too much, the capacitance of the electric double layer capacitor decreases. On the other hand, if the binder is too little, the strength will be weak, and it tends to be difficult to maintain the shape of the electrodes. Accordingly, the amount of the binder is preferably from 5 to 20 wt % in the electrodes.

The electrodes in the present invention can be prepared, for example, by kneading a mixture of carbon material and polytetrafluoroethylene, followed by molding into a sheet. The electrode sheet thus obtained, is preferably bonded by an electroconductive adhesive to a metal current collector. Here, as the metal current collector, a foil of metal such as aluminum or stainless steal is preferred. When a pair of electrodes are arranged to face each other, then impregnated with an electrolyte and accommodated in a coin-shaped casing, the casing and its cover may be made of a metal to let them have a function as a current collector.

Otherwise, a carbon material may be dispersed in a liquid having a binder such as polyvinylidene fluoride dissolved or dispersed in a solvent, to obtain a slurry, and the slurry may be coated on a metal current collector to form an electrode.

Usually, the above electrodes are used for both positive and negative electrodes to constitute an electric double layer capacitor. However, an electric double layer capacitor may be constructed by using the above electrode as either a positive electrode or a negative electrode, and using a non-polarizable electrode comprising active material for a secondary cell capable of charging and discharging, as the other electrode.

The electric double layer capacitor of the present invention can be used in any one of a coin type wherein an element having a separator sandwiched between positive and negative electrodes, is accommodated together with an electrolyte in a metal casing, which is closed by a metal cover via a gasket, a rolled type wherein an element having positive and negative electrodes rolled with a separator interposed therebetween, is accommodated and sealed together with an electrolyte in a metal casing, and a laminated type wherein an element having many sheet-shaped positive and negative electrodes alternately laminated with a separator interposed therebetween, is incorporated.

Now, the present invention will be described in further detail with reference to working Examples of the present invention (Examples 1 to 5) and Comparative Examples (Examples 6 to 9), but it should be understood that the present invention is by no means restricted to such specific working Examples.

EXAMPLE 1

Ethanol was added to a mixture comprising 80 wt % of steam-activated coconut shell active carbon having a specific surface area of 1,800 $m^2/g$, 10 wt % of polytetrafluoroethylene and 10 wt % of carbon black, and the resulting mixture was kneaded and formed into a sheet. The sheet was further rolled to a thickness of 0.6 mm. The obtained sheet was punched into disks having a diameter of 12 mm to obtain positive and negative electrodes. Such disk-shaped positive and negative electrodes were bonded by means of a graphite-type conductive adhesive on the positive and negative electrode sides, respectively, inside a stainless steel casing which functions not only as a current collector but also as a housing of a coin-type cell. Then, together with this stainless steel casing, the electrodes were subjected to heat treatment under reduced pressure to remove water, etc.

Then, the positive and negative electrodes were impregnated with an electrolyte having $(C_2H_5)_3(CH_3)NBF_4$ dissolved at a concentration of 1.5 mol/l in a mixed solvent comprising propylene carbonate and methyl ethyl carbonate in a volume ratio for 80:20, and a fluorine-containing polymer resin having carbonaceous powder supported thereon. A separator sheet made of a non-woven fabric of polypropylene fiber was interposed between the positive and negative electrodes, and the stainless steal casing was caulked and sealed via a gasket as an insulator, to obtain coin-shaped electric double layer capacitor having a diameter of 18.4 mm and a thickness of 2.0 mm.

EXAMPLE 2

A coin-shaped electric double layer capacitor was prepared in the same manner as in Example 1 except that as the electrolyte, a solution having $(C_2H_5)_2(CH_3)_2NBF_4$ dissolved at a concentration of 1.5 mol/l in a mixed solvent comprising propylene carbonate and ethyl propyl carbonate in a volume ratio of 75:25, was used.

EXAMPLE 3

A coin-shaped electric double layer capacitor was a prepared in the same manner as in Example 1 except that as the electrolyte, a solution having $(C_2H_5)_3(n-C_3H_7)NBF_4$ dissolved at a concentration of 1.5 mol/l in a mixed solvent comprising propylene carbonate and methyl ethyl carbonate in a volume ratio of 70:30, was used.

EXAMPLE 4

A coin-shaped electric double layer capacitor was prepared in the same manner as in Example 1 except that as the electrolyte, a solution having $(C_2H_5)_4NBF_4$ dissolved at a concentration of 1.0 mol/l in a mixed solvent comprising propylene carbonate and methyl ethyl carbonate in a volume ratio of 80:20, was used.

EXAMPLE 5

A coin-shaped electric double layer capacitor was prepared in the same manner as in Example 1 except that the positive and negative electrodes were prepared by using a carbon material having a specific surface area of 2,000 m$^2$/g, obtained by baking a resol resin at 650° C. in a nitrogen atmosphere, followed by activation treatment with molten KOH, instead of the steam-activated coconut shell active carbon, and a mixed solvent comprising propylene carbonate and methyl ethyl carbonate in a volume ratio of 90:10, was used as the solvent for the electrolyte.

EXAMPLE 6

A coin-shaped electric double layer capacitor was prepared in the same manner as in Example 1 except that propylene carbonate was used alone as the solvent for the electrolyte.

EXAMPLE 7

A coin-shaped electric double layer capacitor was prepared in the same manner as in Example 2 except that propylene carbonate was used alone as the solvent for the electrolyte.

EXAMPLE 8

A coin-shaped electric double layer capacitor was prepared in the same manner as in Example 1 except that a mixed solvent comprising propylene carbonate and diethyl carbonate in a volume ratio of 80:20, was used as the solvent for the electrolyte.

EXAMPLE 9

A coin-shaped electric double layer capacitor was prepared in the same manner as in Example 4 except that propylene carbonate was used alone as the solvent for the electrolyte.

Evaluation

With respect to each of the electric double layer capacitors of Examples 1 to 9, the electric discharge capacitance and the internal resistance at 25° C. and −25° C. were measured. The internal resistance was calculated from the voltage drop at each discharge current. The discharge was carried out at 0.5 mA and 5.0 mA from 2.5 V to 1.0 V. The results at 0.5 mA are shown in Table 1, and the results at 5.0 mA are shown in Table 2.

It is evident from Tables 1 and 2 that the electric double layer capacitors of the present invention are excellent in capacitor characteristics at a low temperature, as the decrease in capacitance and the increase in internal resistance are small during large current discharge at −25° C.

TABLE 1

|  | 25° C. | | −25° C. | |
| --- | --- | --- | --- | --- |
|  | Capacitance (F) | Internal resistance (Ω) | Capacitance (F) | Internal resistance (Ω) |
| Example 1 | 2.11 | 8.5 | 2.01 | 15.1 |
| Example 2 | 2.03 | 8.3 | 1.96 | 15.7 |
| Example 3 | 1.98 | 9.4 | 1.82 | 16.6 |
| Example 4 | 1.95 | 13.4 | 1.36 | 26.7 |
| Example 5 | 2.23 | 7.1 | 2.07 | 13.5 |
| Example 6 | 2.04 | 9.7 | 1.82 | 20.8 |
| Example 7 | 1.97 | 9.4 | 1.67 | 21.9 |
| Example 8 | 2.06 | 8.8 | 1.91 | 18.4 |
| Example 9 | 1.98 | 13.1 | 1.14 | 34.3 |

TABLE 2

|  | 25° C. | | −25° C. | |
| --- | --- | --- | --- | --- |
|  | Capacitance (F) | Internal resistance (Ω) | Capacitance (F) | Internal resistance (Ω) |
| Example 1 | 1.69 | 9.6 | 0.68 | 29.3 |
| Example 2 | 1.58 | 9.9 | 0.63 | 27.9 |
| Example 3 | 1.58 | 11.0 | 0.68 | 31.4 |
| Example 4 | 1.36 | 16.3 | 0.41 | 45.3 |
| Example 5 | 1.78 | 9.1 | 0.80 | 27.5 |
| Example 6 | 1.43 | 12.7 | 0.28 | 92.7 |
| Example 7 | 1.38 | 11.2 | 0.27 | 103.6 |
| Example 8 | 1.60 | 10.8 | 0.42 | 42.3 |
| Example 9 | 1.38 | 15.6 | 0.24 | 56.7 |

The electric double layer capacitor of the present invention has excellent characteristics such that the voltage drop at a low temperature is small, and the decrease in capacitance and the increase in internal resistance are small during its use at a low temperature. With the electric double layer capacitor of the present invention, large current discharge is possible even at a low temperature.

What is claimed is:

1. An electric double layer capacitor comprising at least one electrode made of carbon material as a main component, and an electrolyte capable of forming an electric double layer at the interface with the at least one electrode, wherein the electrolyte comprises an organic mixed solvent containing propylene carbonate and an asymmetrical chain carbonic acid ester represented by the general formula $R^1OC(=O)OR^2$, wherein $R^1$ and $R^2$ are mutually different monovalent organic groups, and a solute comprising a quaternary onium salt.

2. The electric double layer capacitor according to claim 1, wherein each of $R^1$ and $R^2$ is an organic group selected from the group consisting of a methyl group, an ethyl group, an isopropyl group, a n-propyl group and a 2,2,2-trifluoroethyl group.

3. The electric double layer capacitor according to claim 1, wherein the asymmetrical chain carbonic acid ester is methyl ethyl carbonate.

4. The electric double layer capacitor according to claim 1, wherein the solvent for the electrolyte comprises from 60 to 95 vol % of propylene carbonate and from 5 to 40 vol % of the asymmetrical chain carbonic acid ester.

5. The electric double layer capacitor according to claim 1, wherein the solvent for the electrolyte comprises from 80 to 90 vol % of propylene carbonate and from 10 to 20 vol % of the asymmetrical chain carbonic acid ester.

6. The electric double layer capacitor according to claim 1, wherein the quaternary onium salt is a salt of a cation represented by $R^3R^4R^5R^6N^+$ or $R^3R^4R^5R^6P^+$, wherein each of $R^3$, $R^4$, $R^5$ and $R^6$ which are independent of one another, is a monovalent organic group.

7. The electric double layer capacitor according to claim 6, wherein each of $R^3$, $R^4$, $R^5$ and $R^6$ which are independent of one another, is a $C_{1-4}$ alkyl group.

8. The electric double layer capacitor according to claim 7, wherein any two among $R^3$, $R^4$, $R^5$ and $R^6$ are different from each other.

9. The electric double layer capacitor according to claim 8, wherein the quaternary onium salt is $(C_2H_5)_3(CH_3)NBF_4$.

10. The electric double layer capacitor according to claim 1, wherein the concentration of the solute in the electrolyte is from 1.0 to 2.0 mol/l.

11. The electric double layer capacitor according to claim 1, wherein said at least one electrode comprises both positive and negative electrodes and are made of carbon material as the main component.

12. The electric double layer capacitor according to claim 1, wherein the carbon material has a specific surface area of from 500 to 3,000 $m^2$/g.

13. An electrolyte for an electric double layer capacitor, which comprises an organic type mixed solvent containing propylene carbonate and an asymmetrical chain carbonic acid ester represented by the general formula $R^1OC(=O)OR^2$, wherein $R^1$ and $R^2$ are mutually different monovalent organic groups, and a solute comprising a quaternary onium salt.

14. The electrolyte for an electric double layer capacitor according to claim 13, wherein each of $R^1$ and $R^2$ is an organic group selected from the group consisting of a methyl group, an ethyl group, an isopropyl group, a n-propyl group and a 2,2,2-trifluoethyl group.

15. The electrolyte for an electric double layer capacitor according to claim 13, wherein the asymmetrical chain carbonic acid ester is methyl ethyl carbonate.

16. The electrolyte for an electric double layer capacitor according to claim 13, wherein the solvent for the electrolyte comprises from 60 to 95 vol % of propylene carbonate and from 5 to 40 vol % of the asymmetrical chain carbonic acid ester.

17. The electrolyte for an electric double layer capacitor according to claim 13, wherein the quaternary onium salt is a salt having a cation represented by $R^3R^4R^5R^6N^+$ or $R^3R^4R^5R^6P^+$, wherein each of $R^3$, $R^4$, $R^5$ and $R^6$ which are independent of one another, is a monovalent organic group.

* * * * *